May 26, 1953  E. C. KIEKHAEFER  2,639,699
TWO-CYCLE ENGINE AND IMPROVED CRANKCASE
INDUCTION MEANS THEREFOR
Filed Sept. 1, 1951  2 Sheets-Sheet 1

INVENTOR.
Elmer C. Kiekhaefer
BY
Andrus & Sceales
Attorneys

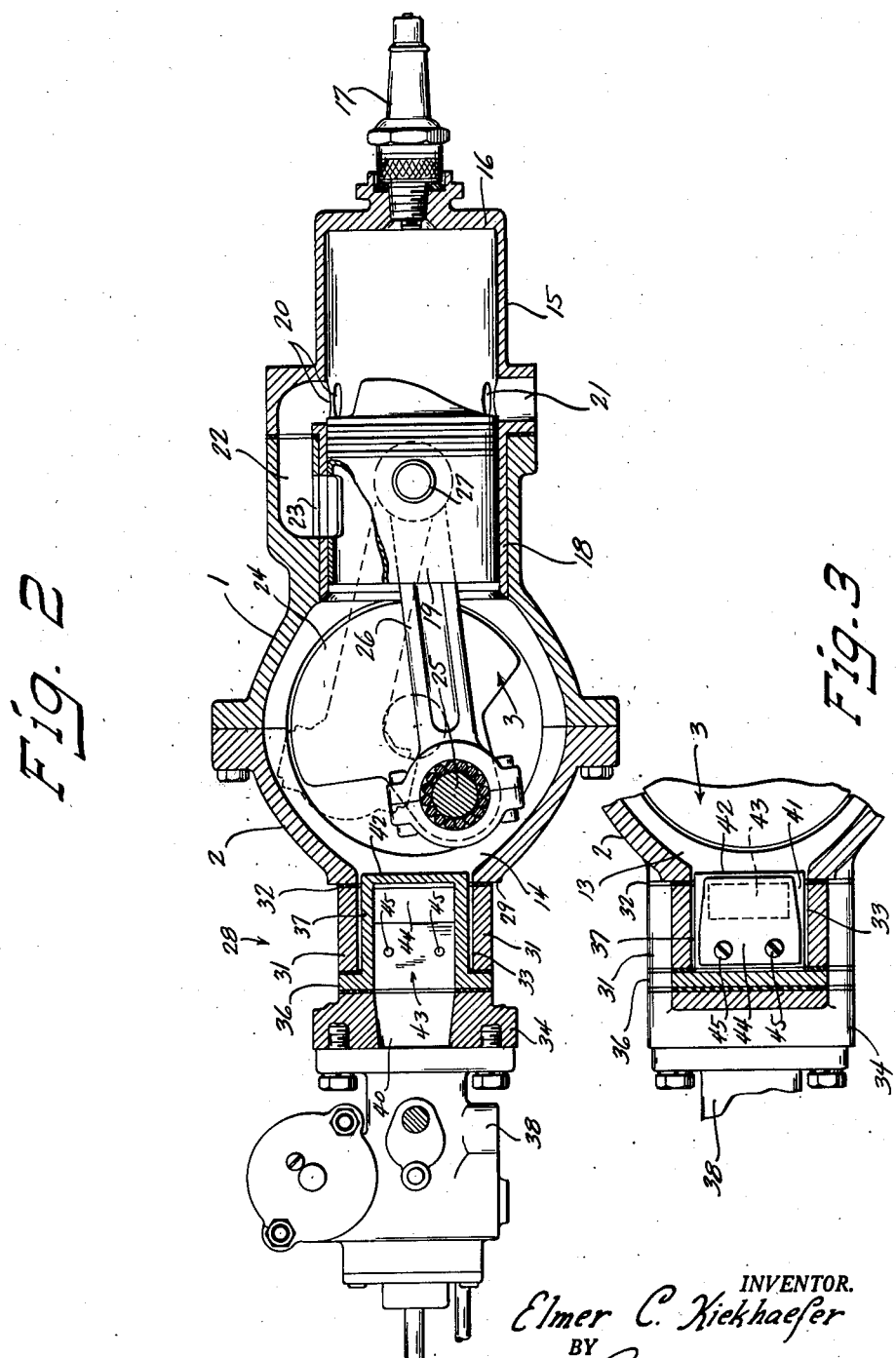

Patented May 26, 1953

2,639,699

UNITED STATES PATENT OFFICE 2,639,699

TWO-CYCLE ENGINE AND IMPROVED CRANKCASE INDUCTION MEANS THEREFOR

Elmer C. Kiekhaefer, Cedarburg, Wis.

Application September 1, 1951, Serial No. 244,800

5 Claims. (Cl. 123—73)

This invention relates to two-cycle internal-combustion engines employing crankcase induction and precompression of the fuel mixture and particularly to the manifold and induction valve providing and controlling the delivery of the fuel mixture to the crankcase.

The invention provides a valve-controlled fuel induction system which delivers the fuel and air mixture to the space between the crank cheeks in a flat stream which can quickly fill the chamber and the space below the piston. The valves controlling the delivery of the mixture are disposed immediate to the space between the crank cheeks for maximum volumetric efficiency of the crankcase compression cycle.

An object of the invention is to increase the efficiency of the engine induction cycle and the operation of the engine.

A more particular object is to increase the delivery of the fuel and air mixture to the crankcase chambers.

A further object is to increase the ratio of pre-compression effected within the crankcase chamber below the piston to enforce a faster, more complete scavenging and recharging of the combustion chamber above the piston.

Another object is to provide an engine with reed valves controlling the induction of the fuel mixture disposed with respect to each other and the dimensional limitations of the crank chamber to provide the maximum fuel intake and crankcase compression ratio for higher engine performance.

Another object is to introduce the fuel mixture directly into the larger open portions of the crankcase and specifically into the space between the crank cheeks, that portion being unobstructed by the crank throw and connecting rod during the induction stroke.

Another object of the invention is to introduce the fuel mixture into the crank chamber between the crank throws and in the general direction of the lower end of the cylinder so that the fuel mixture fills the crankcase and the lower end of the cylinder below the piston in the time interval allowed the induction cycle.

These and other objects and advantages will be more fully set forth in the following description of a preferred embodiment of the invention as illustrated in the accompanying drawings.

In the drawings:

Fig. 2 is a sectional view taken on line 2—2 of Figure 1 and including the carburetor shown in elevation; and Fig. 3 is a detail sectional view taken on line 3—3 of Figure 1.

Figure 1:
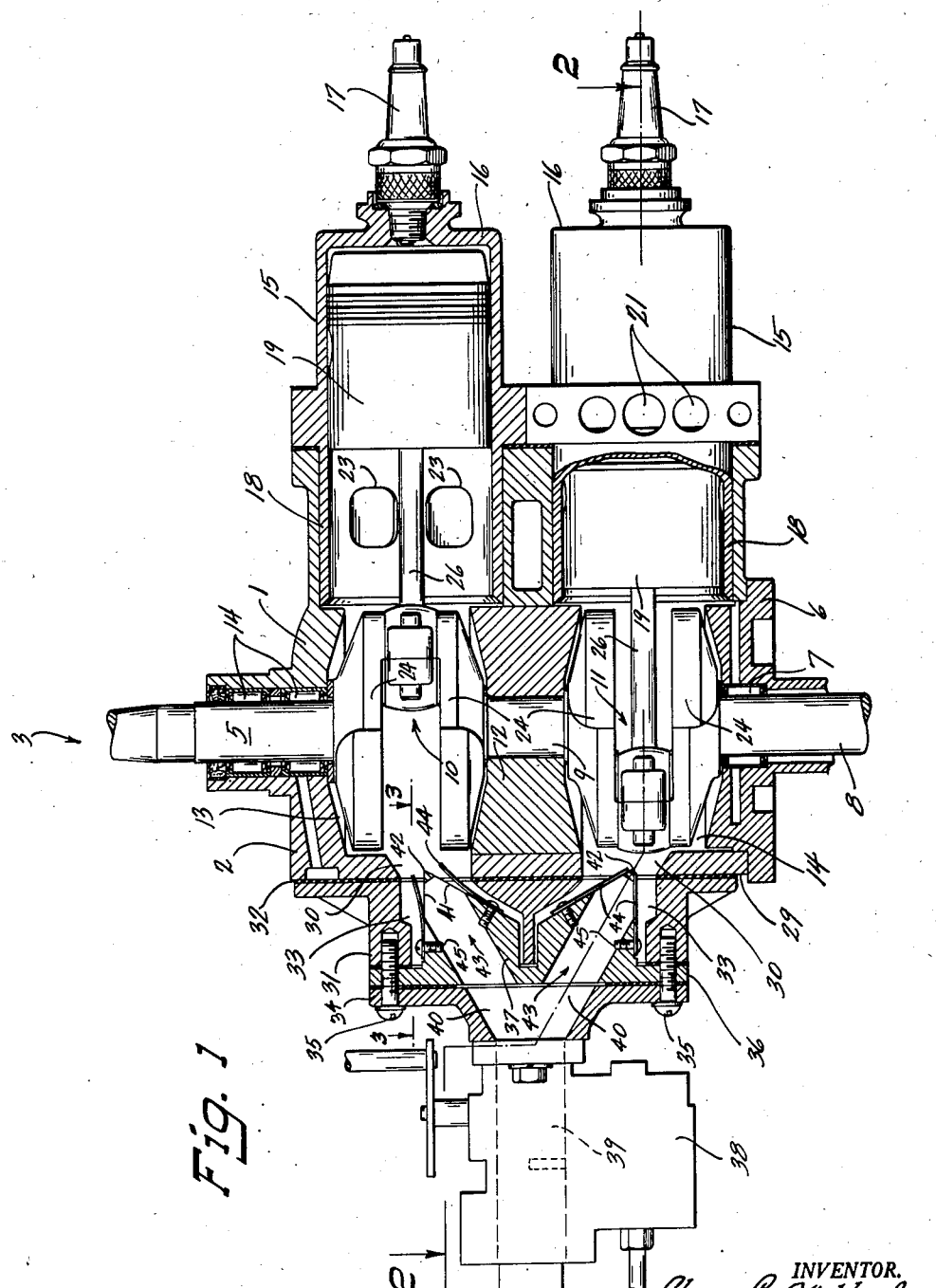
Figure 1 is a sectional view of a two-cycle, alternate-firing two-cylinder engine with the carburetor in elevation.

The two-cylinder, two-cycle engine shown in the drawings includes the crankcase members 1 and 2 which join as shown in Fig. 2 in a transverse plane passing through the axis of the engine crankshaft 3. Members 1 and 2 are closed at their upper end and carry the bearings 4 which journally support the upper end 5 of crankshaft 3. The cylindrical member 6 closes the lower end of the crankcase formed by members 1 and 2 and carries bearing 7 which journally supports the lower end 8 of crankshaft 3. The center main bearing 9 of crankshaft 3 connects the upper and lower crank throws 10 and 11, respectively, of the crankshaft. The cylindrical member 12 is assembled on bearing 9 to journally support the latter and fits between crankcase members 1 and 2 to define therewith upper and lower crank chambers 13 and 14, respectively.

Each cylinder 15 of the engine is formed with its upper combustion end 16 closed and provided with a threaded opening to receive a spark plug 17. The lower sleeve portion 18 of each cylinder is supported by crankcase member 1 and opens into a corresponding crank chamber. Cylinders 15 may be variously secured to carry the pistons 19 therein for reciprocation.

Each cylinder is provided with a series of intake ports 20 and exhaust ports 21 which are controlled and normally closed by the respective piston. The transfer passage 22 extends from an opening 23 in sleeve portion 18 and is formed in crankcase member 1 and a part of cylinder 15 to communicate with the corresponding intake ports 20. Suitable exhaust discharge means, not shown, may be provided to receive the exhaust gases discharged through ports 21. Ports 21 may otherwise as shown open directly to the atmosphere.

Each crank, 10 and 11, comprises the spaced pairs of crank arms 24 joined by the crank pins 25. The rods 26 connect each crank pin 25 with the wrist pin 27 of the piston 19 of the corresponding cylinder and provide for the controlled reciprocation of the pistons and the transmission of power from the pistons to the crankshaft.

In the operation of the engine the air and fuel mixture, generally including an engine lubricant, is drawn into each crank chamber by the upstroke or movement of the corresponding piston away from the crankshaft at the same time the fuel mixture within the upper combustion end 16 of the cylinder is compressed. At the end of the upstroke of the piston the corresponding spark plug 17 ignites the compressed fuel charge to begin the downward power stroke of the piston. During the downward power stroke of the piston the movement of the piston toward the crankshaft effects the compression of the fuel mixture within the corresponding crank chamber. In approaching the end of the downstroke the piston uncovers ports 21 to open the same and allow for the discharge of the burned gases from the cylinder. At the same time or immediately thereafter the ports 20 are uncovered by the piston to open the same and allow the transfer of the compressed fuel mixture from the crank chamber through openings 23 and corresponding openings in the piston into passage 22 and into the upper end of the cylinder to displace the burned gases therein and recharge the cylinder for the next succeeding power stroke of the piston.

Cranks 10 and 11 are spaced 180° of the crankshaft axis so that pistons 19 reciprocate in opposite directions and the cylinders are alternately fired to provide two power strokes with each revolution of the crankshaft.

Total engine output is dependent in large part on the amount of fuel mixture which is drawn into the crank chambers and transferred to the cylinder. At high speeds the short induction period requires a high rate of delivery of the fuel mixture to the crank chambers.

The short period allowed for transfer of the fuel mixture to the cylinders requires a substantial compression of the fuel mixture within the crank chambers to effect such transfer. For example, in the engine shown and described, the ratio of the volume of the crank chamber to the piston displacement should be as low as possible.

To reduce the ratio referred to, the interior dimensions of crank chambers 10 and 11 are made to correspond closely to the dimensions defined by the rotation of the crankshaft and the lateral sweep of the connecting rods 26. However, reducing the size of the crank chambers similarly limits the available areas opening to the crank chambers for delivery of fuel and air mixture at the high rates required.

According to the present invention, the reed valve units 28 provide for the controlled, direct delivery of the fuel and air mixture to the space between the crank cheeks or arms 24 in the direction of the respective pistons 19 for maximum induction efficiency. The planiform face 29 of crankcase member 2 is provided with openings 30 oppositely of the corresponding cylinders 15 and the valve case 31 is secured against face 29 with the gasket 32 disposed therebetween. Two separate recesses 33 in case 31 receive the corresponding valve units 28 which project therethrough into openings 30. The manifold 34 is secured to case 31 by bolts 35 with the flange 36 of the reed blocks 37 disposed therebetween. The carburetor 38 is secured to manifold 34 and has a fuel delivery passage 39 which communicates with the passages 40 of manifold 34.

Reed blocks 37 are joined and each is provided with angularly opposite planiform faces 41 which meet at an apex 42 forming the inner end of the block. The valve openings in the faces 41 of each block 37 are formed by a passage 43 which communicates with passages 40 of manifold 34 and extends up to or within a short distance of the end of the block. Each reed 44 is secured at one end thereof by the screws 45 and is seated on the respective face 41 of each block. The reeds 44 of each block extend over and normally close the passage 43 extending therein.

Each passage 43 forms equal, acute angles with the faces 41 of the same block and the corresponding reeds 44 so that in the operation of the engine the reeds 44 of each block open equally and simultaneously the respective passage 43 in response to the decreased pressure within the corresponding crank chamber, 13 and 14. The fuel and air mixture from carburetor 38 passes between the reeds and is directed into the respective chamber. In the open position each reed is flexed along its length so that the free end of the reed extends inwardly of the crank chamber and generally parallel to the direction of passage 43 of the corresponding block 37. Each reed 44 is of a generally rectangular shape and is disposed with a straight edge at the free end so that fuel and air mixture passes between the open reeds in a flat stream between the two crank cheeks.

According to the invention the reed valve units 28 are opened for the admission of the air and fuel mixture to the crankcase between the crank cheeks 24 therein as the connecting rod 26 passes between the cheeks. The movement of the rod 26 past the reeds creates a slight additional reduction in pressure which in the small period of time allowed the completion of the induction cycle, provides a noticeable improvement in the operation of the engine.

During the induction cycle the connecting rod 26 moves from the position shown in dotted lines in Fig. 2, to the side of the crankcase and away from the reed valves which allows the air and fuel mixture passing the valves to travel directly and without obstruction to fill the space in cylinder 15 below the piston.

The stream of air and fuel mixture enters the crank chambers with a minimum of interference by the crank cheeks 24 and particularly the counterweight portions 46 which are disposed oppositely of the crank pins 25 and move toward the point of admission of the air and fuel stream.

The invention provides for the direct, straight-line travel of the fuel mixture from the manifold into the crankcase chambers and past valves which open and close in response to the reduced pressure conditions within the crankcase chambers to control the mixture.

In the two-cylinder embodiment of the invention as shown, the separate intake passages 43 communicate with passages 40 of manifold 34 and extend in generally straight lines from carburetor passage 39 to openings 30 in crankcase member 2.

The invention provides maximum induction of the fuel and air mixture for higher speeds of operation which require larger supplies of air at higher rates of delivery without appreciably increasing the size of the crank chambers. As in the engine shown, space is allowed and required only for the necessary clearances for assembly and to allow crankshaft 3, pistons 19, rods 26 and reeds 44 to operate.

Various embodiments of the invention may be employed within the scope of the accompanying claims.

I claim:

1. In a two-cycle, internal-combustion engine, a crankshaft including a pair of spaced crank arms and a crank pin connecting said crank arms, a piston, a rod connecting said piston and said crank pin for reciprocation of said piston, separable crankcase members supporting said crankshaft and defining a crank chamber subject to alternate periods of compression and decompression with the reciprocation of said piston, the confines of said crank chamber closely corresponding to the rotated dimensions of said crankshaft, one of said crankcase members having a fuel and air induction passage with angularly opposite openings into said chamber, and reed valve members oppositely secured to said last named member and having free ends normally covering said passage openings to said chamber, said free ends being flexible for uncovering said passage openings in response to the induction cycle of the engine and movable to parallel positions extending in a direction between said crank arms.

2. In a two-cycle, internal-combustion engine, a crankshaft including a pair of spaced crank arms and a crank pin connecting said crank arms, a piston, a rod connecting said piston and said crank pin for reciprocation of said piston, a crankcase supporting said crankshaft and defining a crank chamber subject to alternate periods of compression and decompression with the reciprocation of said piston, the confines of said crank chamber closely corresponding to the rotated dimensions of said crankshaft, said crankcase having a fuel and air induction passage with angular and opposite openings into said chamber oppositely of said cylinder respecting the crankshaft, and reed valve members oppositely secured to the interior of said crankcase and having free ends normally covering said passage openings to said chamber, said free ends being flexible for uncovering said passage openings in response to movement of said piston away from the crankshaft in the induction cycle of the engine and disposed to extend in a direction to confine the flow of air and fuel mixture between said crank arms and into said chamber generally in the direction of piston movement.

3. In an alternate firing two-cylinder, two-cycle, internal-combustion engine, a crankshaft having two crank throws each including a pair of spaced crank arms and a crank pin connecting said crank arms of each pair, a piston for each cylinder and a rod connecting each piston and a corresponding crank pin for reciprocation of the respective piston, a crankcase supporting said crankshaft and defining separate adjacent crank chambers subject to alternate periods of compression and decompression with the reciprocation of the corresponding piston, the confines of said crank chambers closely corresponding to the rotated dimensions of said crankshaft, a carburetor secured to said crankcase and having a mixing passage for air and fuel to be delivered to the engine, and induction passages formed in said crankcase communicating at one end with said carburetor passage and extending at equal angles therefrom to a corresponding crank chamber, said induction passages opening into the respective crank chambers in a direction extending between said crank arms, and reed valves oppositely secured to said crankcase and having free ends normally covering said passages opening into said chamber, said free ends being flexible for uncovering said passages in response to the induction cycle of the engine to direct the flow of air and fuel mixture between said crank arms and generally in the direction of piston movement.

4. In a two-cycle, internal-combustion engine, a crankshaft having a crank throw including a pair of spaced crank arms and a crank pin connecting said crank arms, a piston for the engine cylinder and a rod connecting said piston and the crank pin for reciprocation of the piston, separable crankcase members supporting said crankshaft and defining a crank chamber subject to alternate periods of compression and decompression with the reciprocation of the piston, a carburetor having a mixing passage for air and fuel to be delivered to the engine, one of said crankcase members having a projecting valve body extending into the crank chamber, said valve body having planiform faces relatively angularly disposed and adjoining at the inner end thereof, an induction passage formed in said last named member communicating at one end with said carburetor passage and extending to the end of said valve body and opening from the adjoining faces thereof into the crank chamber in a direction extending between the crank arms of the chamber, and reed valve members secured to the valve body with the free ends thereof extending toward the end of the valve body and normally seated on each planiform face thereof and closing the passage therein, said free ends being flexible for uncovering said passage in response to the induction cycle of the engine and to direct the flow of air and fuel mixture between said crank arms and generally in the direction of piston movement during the induction cycle.

5. In an alternate firing two-cylinder, two-cycle, internal-combustion engine, a crankshaft having two crank throws each including a pair of spaced crank arms and a crank pin connecting said crank arms of each pair, a piston for each cylinder and a rod connecting each piston and a corresponding crank pin for reciprocation of the respective piston, separable crankcase members supporting said crankshaft and defining individual adjacent crank chambers subject to alternate periods of compression and decompression with the reciprocation of the corresponding piston, a carburetor having a mixing passage for air and fuel to be delivered to the engine, one of said crankcase members having projecting valve bodies extending into corresponding crank chambers, each valve body having planiform faces relatively angularly disposed and adjoining at the inner end thereof, induction passages formed in said last named member jointly communicating at one end with said carburetor passage and respectively extending to the ends of said valve bodies and opening from the adjoining faces thereof into the corresponding crank chambers in a direction extending between the crank arms of the respective chamber, and reed valve members secured to each valve body with the free ends thereof extending toward the end of the valve body and normally seated on each planiform face thereof and closing the passage therein, said free ends being flexible for uncovering said passages in response to the induction cycle of the engine and to direct the flow of air and fuel mixture between said crank arms and generally in the direction of piston movement during the induction cycle.

ELMER C. KIEKHAEFER.

References Cited in the file of this patent

UNITED STATES PATENTS

| Number | Name | Date |
|---|---|---|
| 1,130,526 | Laurin | Mar. 2, 1915 |
| 1,408,385 | Newton | Feb. 28, 1922 |
| 2,089,366 | Hansen | Aug. 10, 1937 |
| 2,148,071 | Irgens | Feb. 21, 1939 |
| 2,428,199 | Buske | Sept. 30, 1947 |

FOREIGN PATENTS

| Number | Country | Date |
|---|---|---|
| 478,399 | Great Britain | Jan. 18, 1938 |